United States Patent
Fleishman et al.

(10) Patent No.: US 9,057,441 B2
(45) Date of Patent: *Jun. 16, 2015

(54) SHIFT SYSTEM FOR POWER TRANSMITTING DEVICE

(71) Applicant: Magna Powertrain USA, Inc., Troy, MI (US)

(72) Inventors: Steven M. Fleishman, Lynden, WA (US); Duane Golden, Hastings, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,837

(22) Filed: Nov. 12, 2013

(65) Prior Publication Data

US 2014/0060227 A1    Mar. 6, 2014

Related U.S. Application Data

(63) Continuation of application No. 12/447,965, filed as application No. PCT/US2007/022530 on Oct. 24, 2007, now Pat. No. 8,578,804.

(60) Provisional application No. 60/855,566, filed on Oct. 31, 2006.

(51) Int. Cl.
| | | |
|---|---|---|
| F16H 3/38 | (2006.01) |
| F16H 59/00 | (2006.01) |
| F16H 61/00 | (2006.01) |
| F16H 63/00 | (2006.01) |
| F16H 61/68 | (2006.01) |
| F16D 13/06 | (2006.01) |
| F16D 13/14 | (2006.01) |
| F16D 41/08 | (2006.01) |
| F16D 47/04 | (2006.01) |
| F16D 23/06 | (2006.01) |

(52) U.S. Cl.
CPC ........... *F16H 61/68* (2013.01); *Y10T 74/19242* (2015.01); *Y10T 74/19279* (2015.01); *Y10T 74/19284* (2015.01); *F16D 13/06* (2013.01); *F16D 13/14* (2013.01); *F16D 41/088* (2013.01); *F16D 47/04* (2013.01); *F16D 2023/0631* (2013.01)

(58) Field of Classification Search
None
See application file for complete search history.

(56) References Cited

U.S. PATENT DOCUMENTS 3,931,872 A * 1/1976 Dissett ............................ 192/43
5,178,250 A * 1/1993 Ashikawa et al. .............. 192/38
(Continued)

FOREIGN PATENT DOCUMENTS

| JP | 55078844 A * | 6/1980 | ................ F16H 5/08 |
| JP | 2005016595 A * | 1/2005 | ............. F16D 23/06 |
| WO | WO 2010005795 A1 * | 1/2010 | ............ F16D 43/284 |

*Primary Examiner* — William Kelleher
*Assistant Examiner* — Jake Cook
(74) *Attorney, Agent, or Firm* — Dickinson Wright PLLC

(57) ABSTRACT

A mechanism with an inner race, which has cams, an outer race and rollers between the cams and the outer race. The inner race has a first notch while the outer race has a second notch with a narrow portion and a wider portion. A member is disposed in the first and second notches. Positioning of the member in the first notch and the narrow portion of the second notch inhibits relative rotation between the inner and outer races and power is not transmitted between the outer race and a power transmitting member, such as a gear. Positioning of the member in the first notch and the wider portion of the second notch permits some relative rotation between the inner and outer races to cause the cams to urge the rollers outwardly so that the outer race frictionally engages the power transmitting member to facilitate transmission of rotary power therebetween.

20 Claims, 12 Drawing Sheets

(56) References Cited

U.S. PATENT DOCUMENTS

| | | | |
|---|---|---|---|
| 6,364,083 B1 * | 4/2002 | Gluys et al. | 192/53.31 |
| 6,557,680 B2 * | 5/2003 | Williams | 192/27 |
| 6,652,407 B2 * | 11/2003 | Ronk et al. | 475/204 |
| 6,997,296 B2 * | 2/2006 | Hu et al. | 192/44 |
| 7,004,874 B2 * | 2/2006 | Mizon et al. | 475/198 |
| 7,083,538 B2 * | 8/2006 | Szalony et al. | 475/149 |
| 2002/0084164 A1 * | 7/2002 | Burger | 192/48.91 |
| 2005/0215376 A1 * | 9/2005 | Williams et al. | 475/198 |
| 2010/0024582 A1 * | 2/2010 | Fitzgerald | 74/339 |
| 2010/0078283 A1 * | 4/2010 | Ledetzky et al. | 192/53.362 |

\* cited by examiner

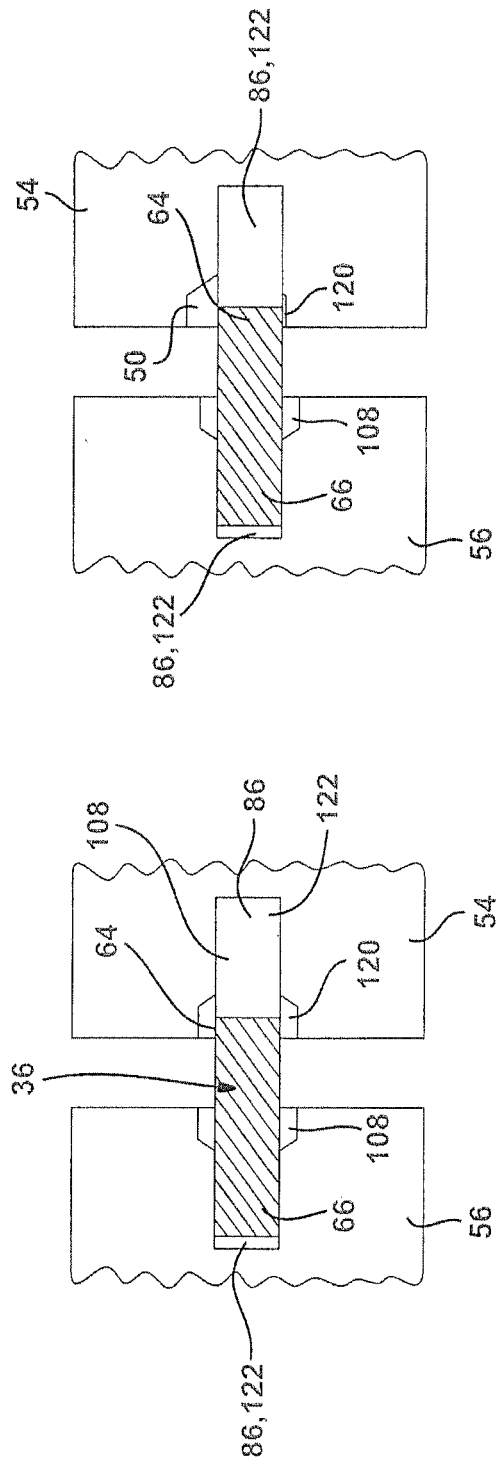

SHIFT SYSTEM FOR POWER TRANSMITTING DEVICE

CROSS-REFERENCE TO RELATED APPLICATIONS

This application is a continuation of U.S. application Ser. No. 12/447,965 filed Apr. 29, 2010, which is a U.S. National Stage of International Application No. PCT/US2007/22530 filed Oct. 24, 2007 which claims the benefit of U.S. Provisional Application No. 60/855,666 filed Oct. 31, 2006. The entire disclosure of each of the above listed applications is incorporated herein by reference.

INTRODUCTION

The present invention generally relates to power transmitting devices, such as automotive transmissions, and a means for controlling the selective coupling of power transmitting members in a power transmitting device.

A wide variety of devices have long been available for mechanical engagement of rotating components. Where such engagement is to occur with the elements rotating, a variety of coupling mechanisms are frequently employed. For example, clutches, fluid couplings, friction bands and synchronizing rings are commonly employed in automotive transmissions. In many circumstances, these devices are quite adequate. However, some of these devices are subject to power loss, rapid wear, lack of sufficient engaging strength and/or lack of sufficient engaging speed.

Mechanisms for automatically locking components have been employed which provide rapid engagement, very substantial engaging strength, and extended wear. One such device is a roller clutch which employs an engagement inner having an inner race, an engagement outer having an outer race and rollers therebetween. One of the two races has cam surfaces which are inclined relative to the other race. The rollers are set within a cage which generally rotates with the cam surfaces. A slight rotation of the cage relative to the cam surfaces results in selected engagement or disengagement of the inner and outer elements through wedging or releasing of the rollers. Such a roller clutch is disclosed in U.S. Pat. No. 3,283,611 to Weismann et al., entitled Positive Drive Differential and U.S. Pat. No. 4,987,790 to Weismann entitled "Transmission", the disclosures of which are hereby incorporated by reference as if fully set forth in detail herein.

In the '611 patent to Weismann et al., automatic disengagement of the mechanism occurs when differential speeds are experienced by the mechanism. However, it was noted in the '790 patent to Weismann that employment of such a roller cam engagement mechanism with selective engagement and disengagement in transmission applications has eluded practical utility as the components exhibit substantially inelastic impact when coupling and, under certain circumstances, can experience repeated bouncing out of wedging engagement. It was further noted in the '790 patent to Weismann that the engagement can be so rapid that damage might be done to other components in the rotating power train and that proper control of the cage such that it will remain properly oriented relative to the cam surfaces and yet remain selectively controllable for engagement and disengagement had also proven difficult. While the engagement mechanism of the '790 patent to Weismann sought to overcome these issues, there nonetheless remains room for improvement.

SUMMARY

In one form, the present teachings provide a power transmitting device having a shaft, a power transmitting member, an inner race, an outer race, a plurality of wedging members and an actuator. The power transmitting member has a bore with a bore surface that is disposed about the shaft. The inner race is coupled for rotation with the shaft and includes a plurality of cam surfaces. The inner race defines a first actuator notch. The outer race is disposed about the inner race and is received in the bore. The outer race is a circumferentially extending band having a pair of end segments that are spaced apart from one another to define a slit therebetween. The outer race has a race surface and defines a second actuator notch. The second actuator notch includes a first portion, a transition portion and a second portion. The first portion is defined by a first width and the second portion is defined by a second width that is smaller than the first width. The transition portion couples the first and second portions. The wedging elements are disposed between the inner race and the outer race and each wedging element is disposed between an associated one of the cam surfaces and the race surface. The actuator has a hub and an actuator member. The hub is mounted on the shaft and aligns the actuator member to the first and second actuator notches. The actuator member is selectively positionable in a first position and a second position. Positioning of the actuator member in the first position places the actuator member in the first actuator notch and the second portion of the second actuator notch to permit the wedging elements to be maintained in a radially inward position that disengages the outer race from the bore surface of the power transmitting member to thereby rotationally disengage the power transmitting member from the shaft. Positioning of the actuator member in the second position places the actuator member in the first actuator notch and the first portion of the second actuator notch to permit the wedging elements to be maintained in a radially outward position that engages the outer race to the bore surface of the power transmitting member to thereby rotationally engage the power transmitting member with the shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 13 is a view similar to that of FIG. 12 but illustrating the engagement mechanism in a second position;

FIG. 14 is similar to FIG. 13, but illustrates relative rotation between the first inner race and the first outer race;

DETAILED DESCRIPTION OF THE VARIOUS EMBODIMENTS

Figure 1:
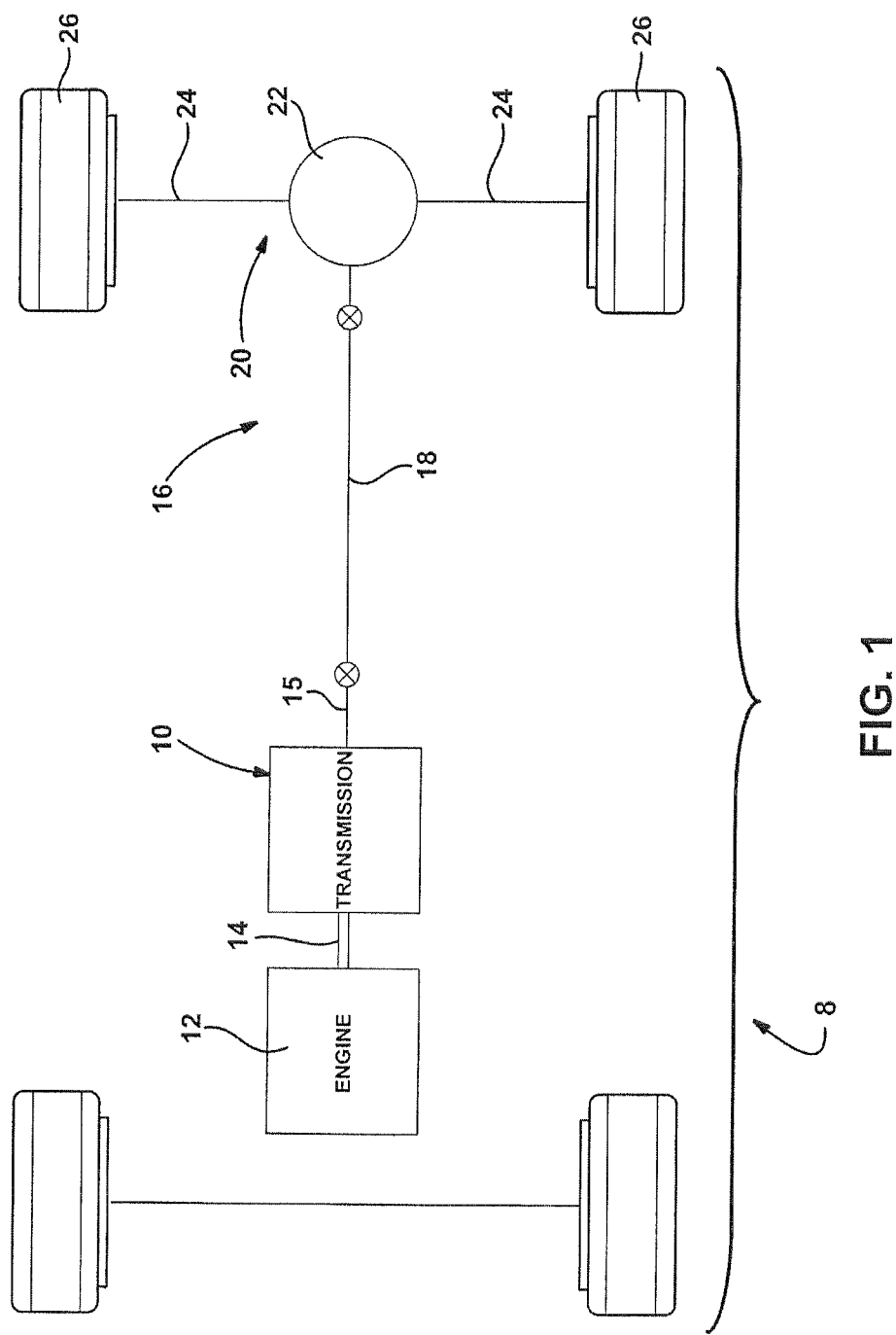
FIG. 1 is a schematic illustration of a vehicle having a power transmitting device constructed in accordance with the teachings of the present disclosure.

With reference to FIG. 1 of the drawings, a vehicle 8 having a power transmitting device 10 constructed in accordance with the teachings of the present invention is schematically illustrated. In the particular example provided, the power transmitting device is a manual transmission, but those of ordinary skill in the art will appreciate that the teachings of the present disclosure have applicability to other types of power transmitting devices, including transfer cases. The vehicle 8 can include a power source, such as an internal combustion engine 12 that supplies rotary power to the transmission 10 via an input shaft 14. An output shaft 15 of the transmission 10 can be coupled to a vehicle driveline 16 in a conventional manner. In the example provided, the vehicle driveline 16 includes a propeller shaft 18 and an axle assembly 20 that includes a differential 22 and a pair of axle shafts 24 that are coupled to the driven wheels 26 of the vehicle 8. Rotary power output through the output shaft 15 is transmitted to the differential 22 via the propeller shaft 18. The differential 22 controls the distribution of drive torque to the driven wheels 26, which are coupled to the differential 22 by the axle shafts 24.

Figure 2:
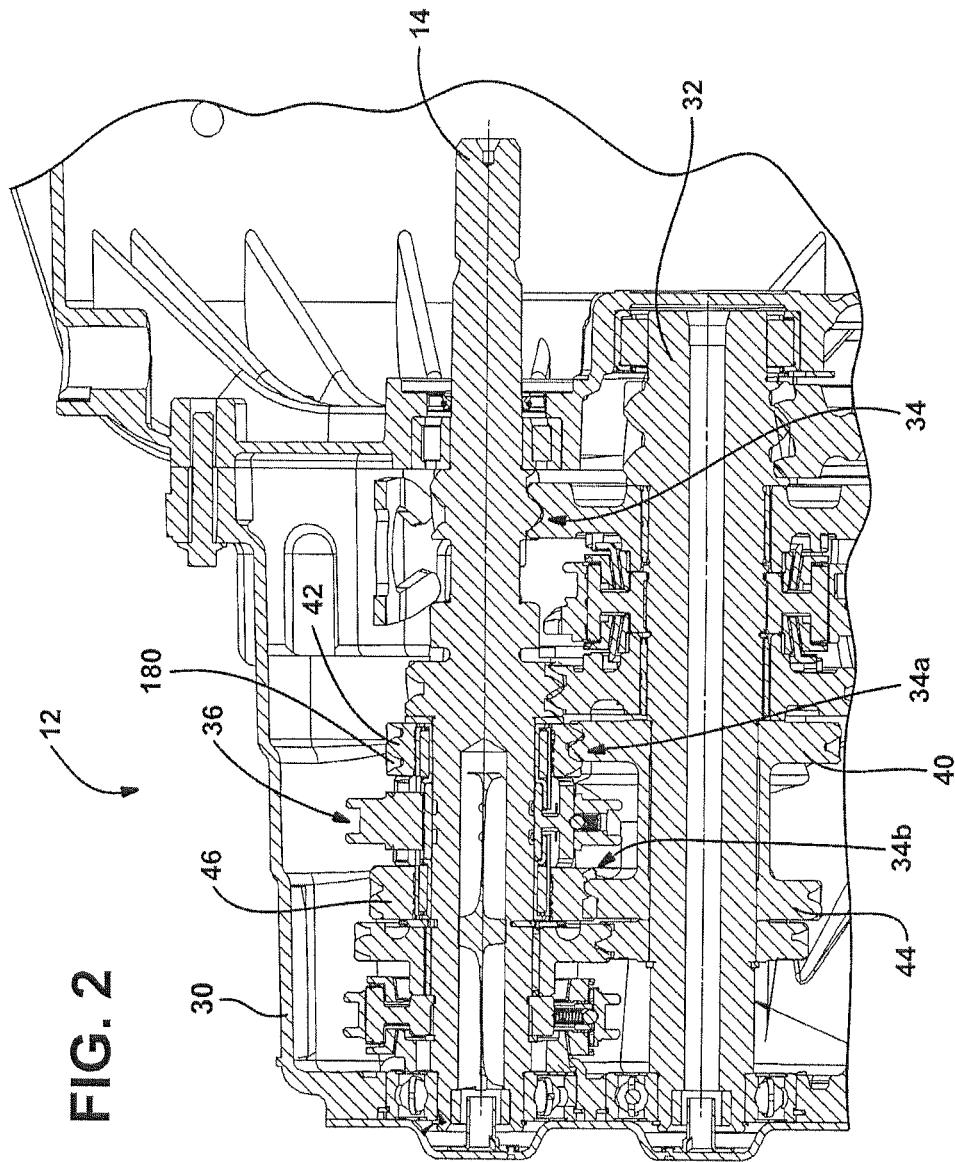
FIG. 2 is a sectional view of a portion of the power transmitting device of FIG. 1.
Figure 3:
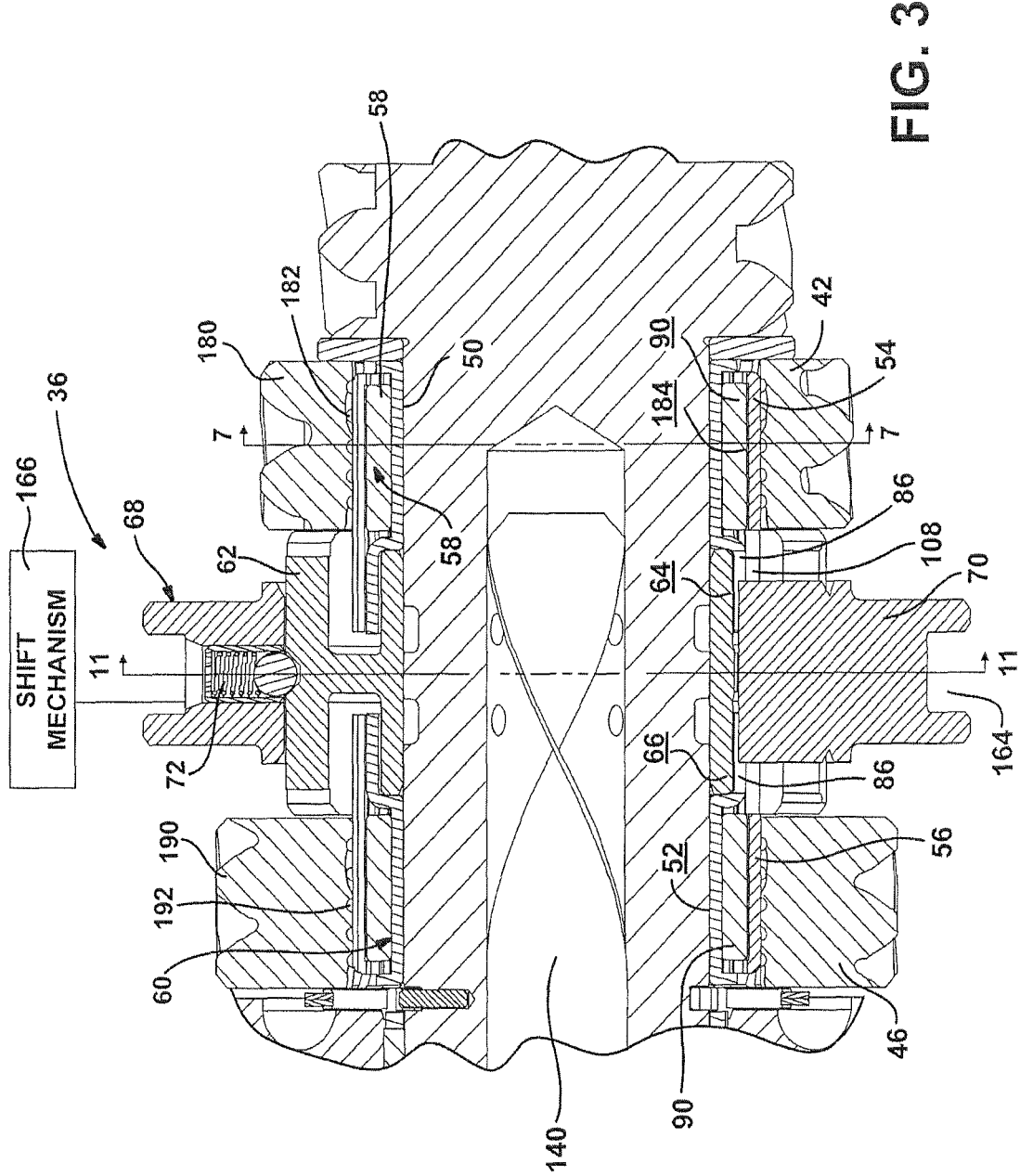
FIG. 3 is an enlarged view of a portion of FIG. 2.
Figure 4:
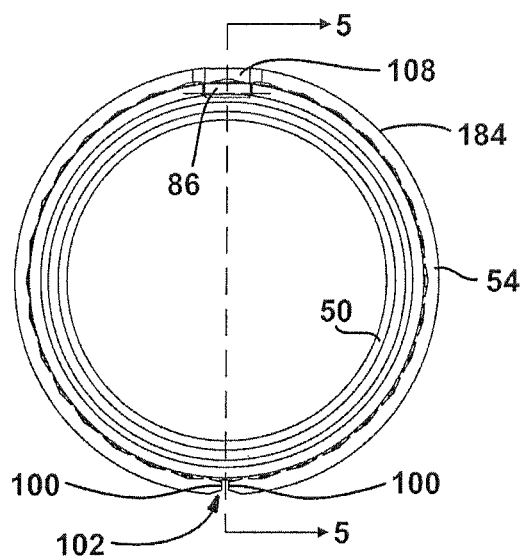
FIG. 4 is a front elevation view of a portion of the power transmitting device of FIG. 1 illustrating the first inner race, the first outer race and the first set of wedging members.
Figure 5:
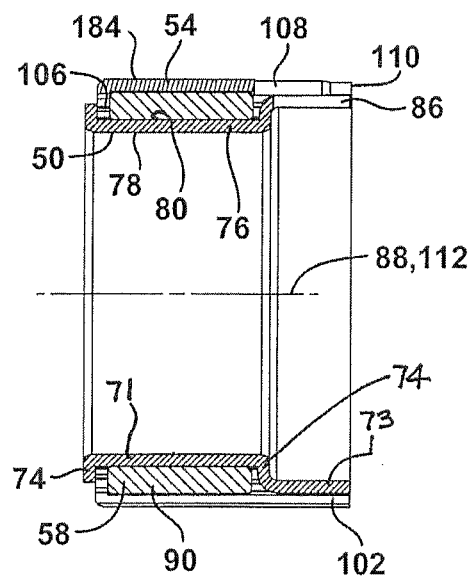
FIG. 5 is a sectional view taken along the line 5-5 of FIG. 4.
Figure 6:
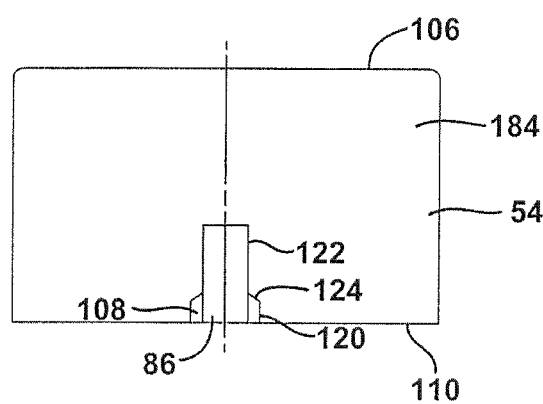
FIG. 6 is a top plan view of the first outer race.

With reference to FIGS. 2 and 3, the transmission 12 is illustrated to include a housing 30 that journally supports the input shaft 14, a counter shaft 32 and the output shaft (not specifically shown). A plurality of gear pairs 34 are associated with the input shaft 14 and the counter shaft 32 and are selectively employed to reduce the speed and increase the torque of the rotary power that is input to the input shaft 14 of the transmission 12. Generally, a first one of gears of each gear pair 34 is coupled for rotation with one of the input shaft 14 and the counter shaft 32, while the second one of the gears of the gear pair 34 is rotatably mounted on the other one of the input shaft 14 and the counter shaft 32. An engagement mechanism 36, which is disposed on the other one of the input shaft 14 and the counter shaft 32, can be employed to selectively lock the second one of the gears of the gear pair 34 to the other one of the input shaft 14 and the counter shaft 32.

For purposes of discussion, a first gear pair 34a can include a first fixed gear 40, which can be coupled for rotation with the counter shaft 32, and a first selective gear 42, which can be mounted for rotation on the input shaft 14, and a second gear pair 34b can include a second fixed gear 44, which can be coupled for rotation with the counter shaft 32, and a second selective gear 46 which can be mounted for rotation on the input shaft 14. It will be appreciated, however, that the first and second fixed gears 40 and 44 could be associated with the counter shaft 32 and the first and second selective gears 42 and 46 could be associated with the input shaft 14.

With specific reference to FIG. 3, the engagement mechanism 36 can include first and second inner races 50 and 52, first and second outer races 54 and 56, first and second sets of wedging elements 58 and 60, a hub 62, first and second actuator members 64 and 66 and a detent mechanism 68 that can include a detent hub 70 and a plurality of detent devices 72.

With reference to FIGS. 4 through 7, the first inner race 50, the first outer race 54 and the first set of wedging elements 58 are illustrated. It will be appreciated that the second inner race 52 (FIG. 3), the second outer race 56 (FIG. 3) and the second set of wedging elements 60 (FIG. 3) can be generally identical to the first inner race 50, the first outer race 54 and the first set of wedging elements 58, respectively, and as such a specific discussion of the second inner race 52 (FIG. 3), the second outer race 56 (FIG. 3) and the second set of wedging elements 60 (FIG. 3) is not needed.

The first inner race 50 can be a band of hardened steel that can define a channel structure 71 and a first circumferentially extending lip member 73. The channel structure 71 can define opposite channel walls 74 and a circumferentially extending channel 76. The channel 76 can have an inner surface 78, which can be fixedly secured to the input shaft 14, for example via an interference fit, and an outer surface 80 that can define a plurality of cam surfaces 82. Each cam surface 82 can be defined by a radius and the first inner race 50 can be thinnest at a circumferential mid-point of the cam surface 82 and thickest at the circumferential ends of the cam surface 82 where the cam surface 82 intersects the adjacent cam surfaces 82. The first circumferentially extending lip member 73 can be coupled to one of the channel walls 74 and can extend laterally outwardly therefrom. A first actuator notch 86 can be formed through a portion of the first circumferentially extending lip member 73 in a direction that is generally parallel to a centerline 88 of the first inner race 50. The first actuator notch 86 can have a predetermined first width (w1).

The first set of wedging elements 58 can include a plurality of rollers 90 that can be received in the channel 76. Each of the rollers 90 can be disposed against an associated one of cam surfaces 82. A cage 92 can be employed to maintain the rollers 90 at a predetermined circumferential spacing.

The first outer race 54 can be a split band of hardened, resilient steel having end surfaces 100 that are circumferentially spaced apart from one another to define a slot 102 therebetween. An inside surface 104 of the first outer race 54 can be disposed in contact with the rollers 90. A first lateral end 106 of the first outer race 54 can extend radially inwardly and can be disposed between the rollers 90 and the channel wall 74 opposite the first actuator notch 86. A second actuator notch 108 can be formed in a second circumferentially extending lip member associated with a second lateral end 110 of the first outer race 54 opposite the first lateral end 106. The second actuator notch 108 can extend generally parallel to the centerline 112 of the first outer race 54 and can be located radially opposite from the slot 102. The second actuator notch 108 can include a first portion 120, a second portion 122 and a transition portion 124 that interconnects the first and second portions 120 and 122. The first portion 120 can have a predetermined second width (w2) that can be wider than the predetermined first width (w1) of the first actuator notch 86. The second portion 122 can have a predetermined third width (w3) that can be about equal to the predetermined first width (w1) of the first actuator notch 86. The transition portion 124 can be shaped in a desired manner, such as tapering (as shown) or arcuate, between the first and second portions 120 and 122.

With reference to FIGS. 3 and 8 through 11, the hub 62 can include an inner sleeve portion 130, an outer sleeve portion 132 and a web member 134 that can interconnect the inner and outer sleeve portions 130 and 132. A plurality of lubrication apertures 138 can be formed radially through the inner and outer sleeve portions 130 and 132. The inner sleeve portion 130 can be coupled for rotation with the input shaft 14 and lubricating oil (not shown) may be fed under pressure through a lubrication gallery 140 (FIG. 3) in the input shaft 14 to through the lubrication apertures 138 to thereby lubricate portions of the engagement mechanism 36. A detent groove 142 can extend about the circumference of the outer sleeve portion 132. The web member 134 can space the outer sleeve portion 132 radially outwardly of the inner sleeve portion 130 to define annular cavities 146 into which the first circumferentially extending lip member 73 (FIG. 5) of the first inner race 50 and the second circumferentially extending lip associated with the second lateral end 110 (FIG. 5) of the first outer race 54 can be received. In this regard, the inner sleeve portion 130 can extend radially outwardly from the input shaft 14 to support the first circumferentially extending lip member 73 (FIG. 5) of the first inner race 50 and the second lateral end 110 (FIG. 5) of the first outer race 54. An actuator slot 150 can be formed radially through the outer sleeve portion 132 and the web member 134. The actuator slot 150 can extend generally parallel to a centerline 152 of the hub 62.

Figure 11:
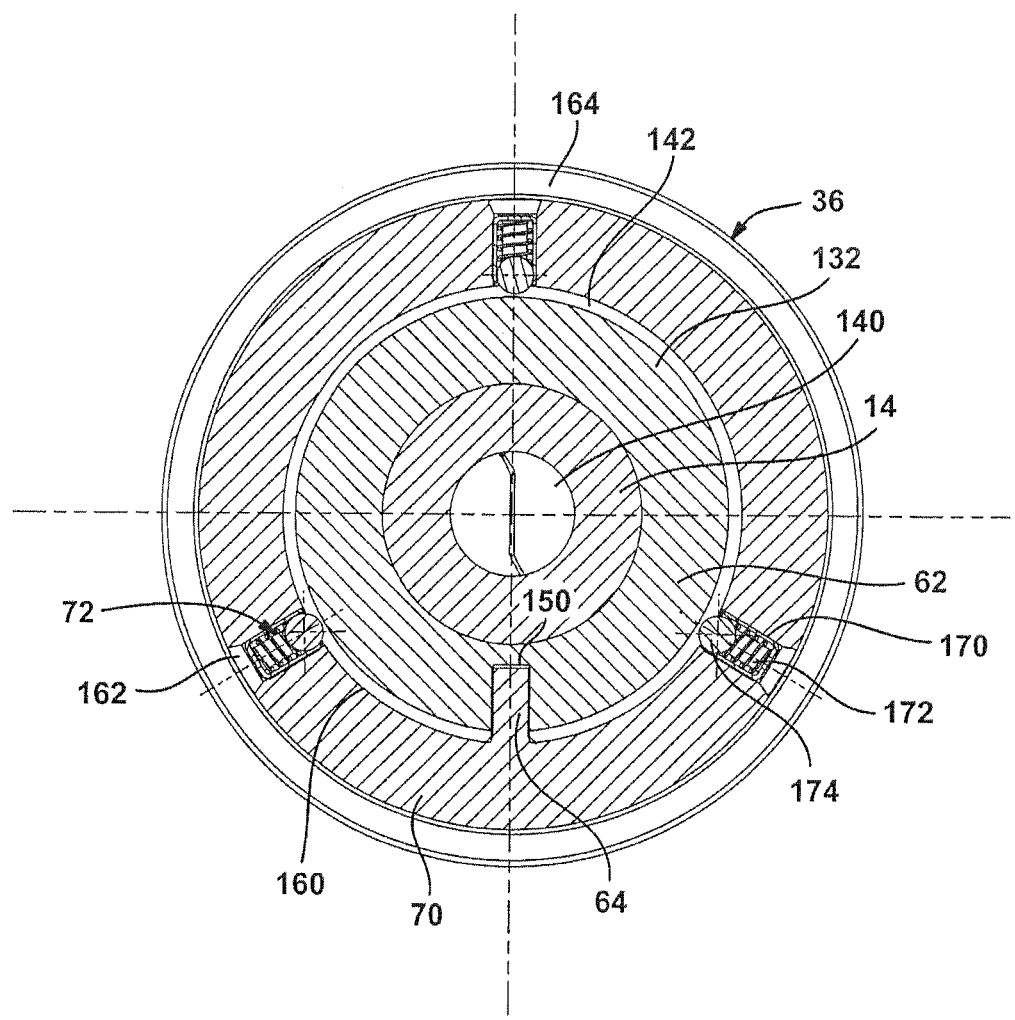
FIG. 11 is a sectional view taken along the line 11-11 of FIG. 3.
Figure 12:
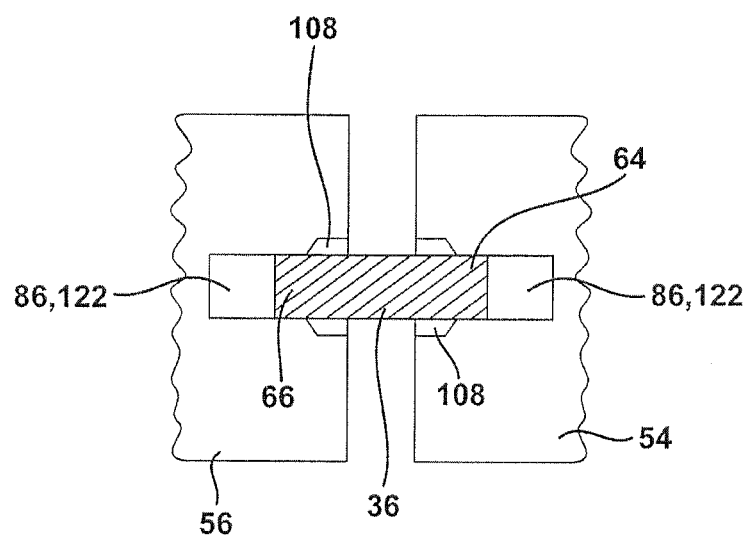
FIG. 12 is a plan view in partial section of a portion of the power transmitting device of FIG. 1 with the engagement mechanism in a first or neutral position.

With reference to FIGS. 3 and 11, the first and second actuator members 64 and 66 are integrally formed with the detent hub 70 in the particular example provided, but those of ordinary skill in the art will appreciate that the first and second actuator members 64 and 66 could be one or more elements that are fixed to the hub 70. The detent hub 70 can be a hollow structure that can define an inner hub surface 160, a plurality of circumferentially spaced apart detent apertures 162 and a circumferentially extending fork groove 164 that is configured to be engaged by shift mechanism 166, which is schematically illustrated. Shift mechanisms are well known in the art and as such, a detailed discussion of the shift mechanism 166 need not be provided herein. The inner hub surface 160 is mounted on the outer sleeve portion 132 of the hub 62 such that the detent hub 70 can translate axially along the hub 62 in two directions. The detent apertures 162 can include holes into which the detent devices 72 are received. In the particular example provided, each detent device 72 includes a detent housing 170, a spring 172 and a detent plunger 174 that is biased outwardly from the detent housing 170 by the spring 172. The detent housing 170 can be coupled to the detent hub 70 via an adhesive and/or an interference fit. The detent plunger 174 is configured to extend through the inner hub surface 160 and engage the outer sleeve portion 132 to resist unintended axial movement of the detent hub 70 relative to the hub 62.

As noted above, the first and second actuator members 64 and 66 can be integrally formed with the detent hub 70. In the particular example provided, the first and second actuator members 64 and 66 are integrated into a single generally rectangular prism that can extend radially inwardly from the detent hub 70. The first and second actuator members 64 and 66 have a width that is about equal to the first predetermined width (w1) of the first actuator notch 86 in the first and second inner races 50 and 52. Accordingly, it will be appreciated that each of the first and second actuator members 64 and 66 can be slidingly received into the first actuator notch 86 and the second portion 122 (FIG. 6) of the second actuator notch 108. The first actuator member 64 can extend through the web member 134 (FIG. 9) of the hub 62 and can be received into the first actuator notch 86 in the first inner race 50 and the second actuator notch 108 in the first outer race 54. Similarly, the second actuator member 66 can extend through the web member 134 (FIG. 9) of the hub 62 and can be received into the first actuator notch 86 in the second inner race 52 and the second actuator notch 108 in the second outer race 56.

With renewed reference to FIG. 3, the first selective gear 42 can include a plurality of gear teeth 180 and bore 182 that is sized to receive the first outer race 54 therein. The bore 182 can have a surface that can be textured (e.g., grooved) to facilitate the formation of a film of lubrication between the surface of the bore 182 and an outer surface 184 of the first outer race 54, as well as frictional engagement between the first outer race 54 and the surface of the bore 182 when the first selective gear 42 is activated by the engagement mechanism 36 to thereby lock the first selective gear 42 to the input shaft 14 for common rotation therewith. Similarly, the second selective gear 46 can include a plurality of gear teeth 190 and a bore 192 that is sized to receive the second outer race 56 therein. The bore 192 can have a surface that can be textured (e.g., grooved) to facilitate the formation of a film of lubrication between the surface of the bore 192 and the outer surface of the second outer race 56, as well as frictional engagement between the surface of the bore 192 and the second outer race 56 when the second selective gear 46 is activated by the engagement mechanism 36 to thereby lock the second selective gear 46 to the input shaft 14 for common rotation therewith.

With reference to FIGS. 3 and 12 through 16, the engagement mechanism 36 can be operated in a first mode, a second mode and a third mode. With specific reference to FIGS. 3 and 12, the engagement mechanism 36 is illustrated in the first or neutral mode wherein the first actuator member 64 is disposed in the first actuator notch 86 in the first inner race 50 and the second portion 122 of the second actuator notch 108 in the first outer race 54 and the second actuator member 66 is disposed in the first actuator notch 86 in the second inner race 52 and the second portion 122 of the second actuator notch 108 in the second outer race 56. In this condition, the first inner race 50 is rotationally locked to the first outer race 54 (via the first actuator member 64) and the first set of wedging elements 58 can be disposed at or proximate the circumferential mid-point of an associated cam surface 82 (FIG. 7) to thereby disengage the first outer race 54 from the surface of the bore 182, which can decouple the first selective gear 42 from the input shaft 14 to permit relative rotation between the input shaft 14 and the first selective gear 42. Similarly, the second inner race 52 is rotationally locked to the second outer race 56 (via the second actuator member 66) and the second set of wedging elements 60 can be disposed at or proximate the circumferential mid-point of an associated cam surface 82 to thereby disengage the second outer race 56 from the surface of the bore 192, which can decouple the second selective gear 46 from the input shaft 14 to permit relative rotation between the input shaft 14 and the second selective gear 46. With brief reference to FIG. 11, the plungers 174 of the detent devices 72 can be engaged to the detent groove 142 in the hub 62 to resist axial movement of the detent hub 70 and the actuator members (e.g., the first actuator member 64) to maintain the engagement mechanism 36 in the first mode.

With specific reference to FIGS. 3 and 13, the engagement mechanism 36 is illustrated in the second mode wherein the detent hub 70 is translated toward the second selective gear 46. In this position, the first actuator member 64 is disposed in the first actuator notch 86 in the first inner race 50 and the first portion 120 of the second actuator notch 108 in the first outer race 54 and the second actuator member 66 is disposed in the first actuator notch 86 in the second inner race 52 and the second portion 122 of the second actuator notch 108 in the second outer race 56. As the width of the first actuator member 64 is smaller that the width of the first portion 120 of the second actuator notch 108, a limited amount of relative rotation is permitted between the first inner race 50 and the first outer race 54. However, the second inner race 52 and the second outer race 56 are rotatably locked (via the second actuator member 66) as described above. Relative rotation between the first inner race 50 and the first outer race 54, which is illustrated in FIG. 14, causes the first set of wedging elements 58 to rotate relative to the cam surfaces 82 (FIG. 7) such that the rollers 90 are moved from a point at or proximate the mid-point of the cam surfaces 82 (FIG. 7) to a point proximate one of the ends of the cam surfaces 82. As the cam surfaces 82 (FIG. 7) are thicker at their ends, it will be appreciated that the rollers 90 of the first set of wedging elements 58 move radially outwardly, thereby engaging the first outer race 54 against the surface of the bore 182 to rotationally lock the first selective gear 42 to the first outer race 54. Consequently, rotary power can be transmitted between the input shaft 14 and the first selective gear 42.

Figure 7:
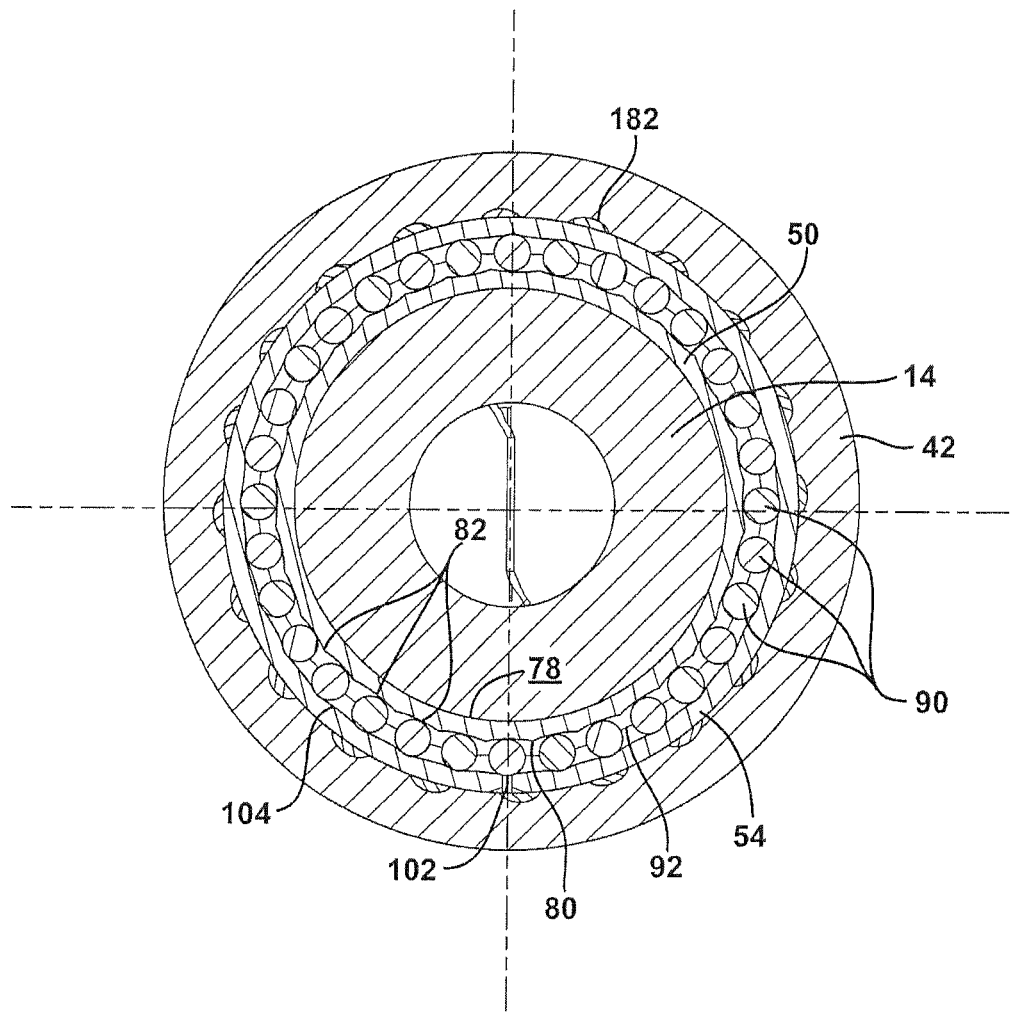
FIG. 7 is a sectional view taken along the line 7-7 of FIG. 3.
Figure 8:
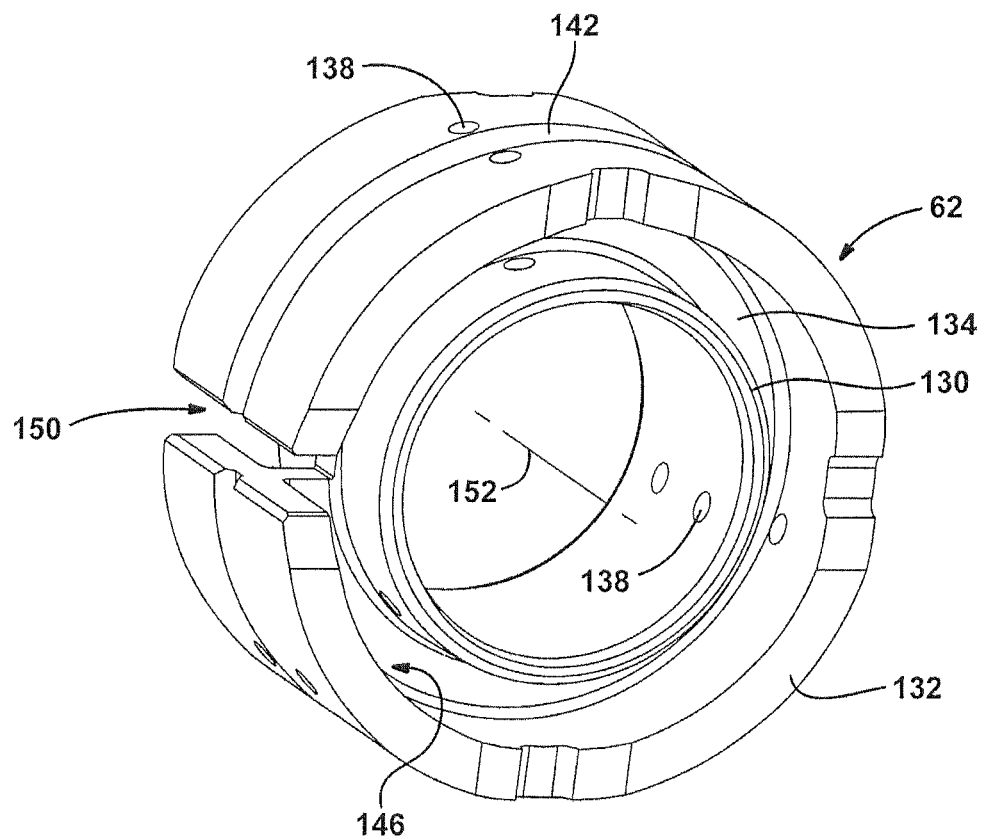
FIG. 8 is a perspective view of a portion of the power transmitting device of FIG. 1 illustrating the hub in greater detail.
Figure 9:
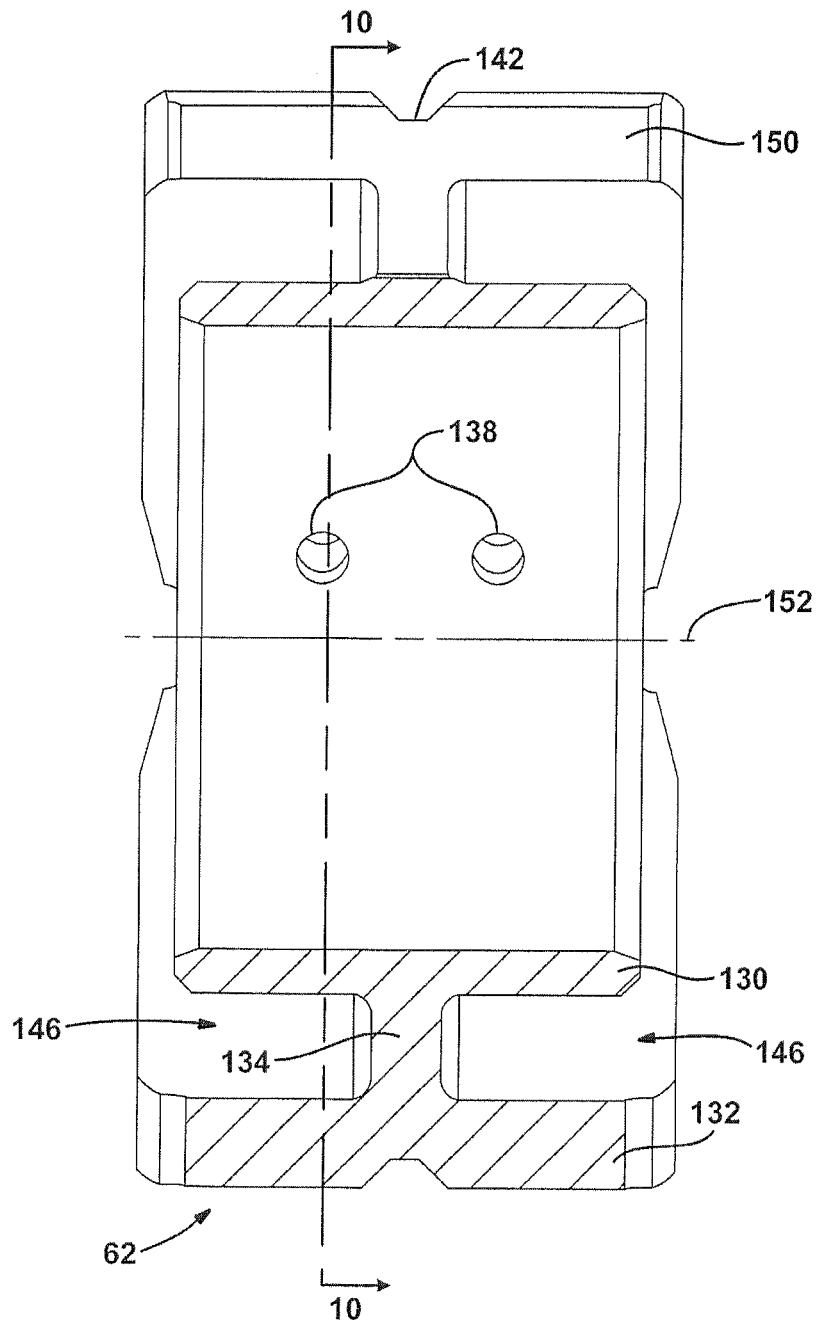
FIG. 9 is a sectional view of the hub.
Figure 10:
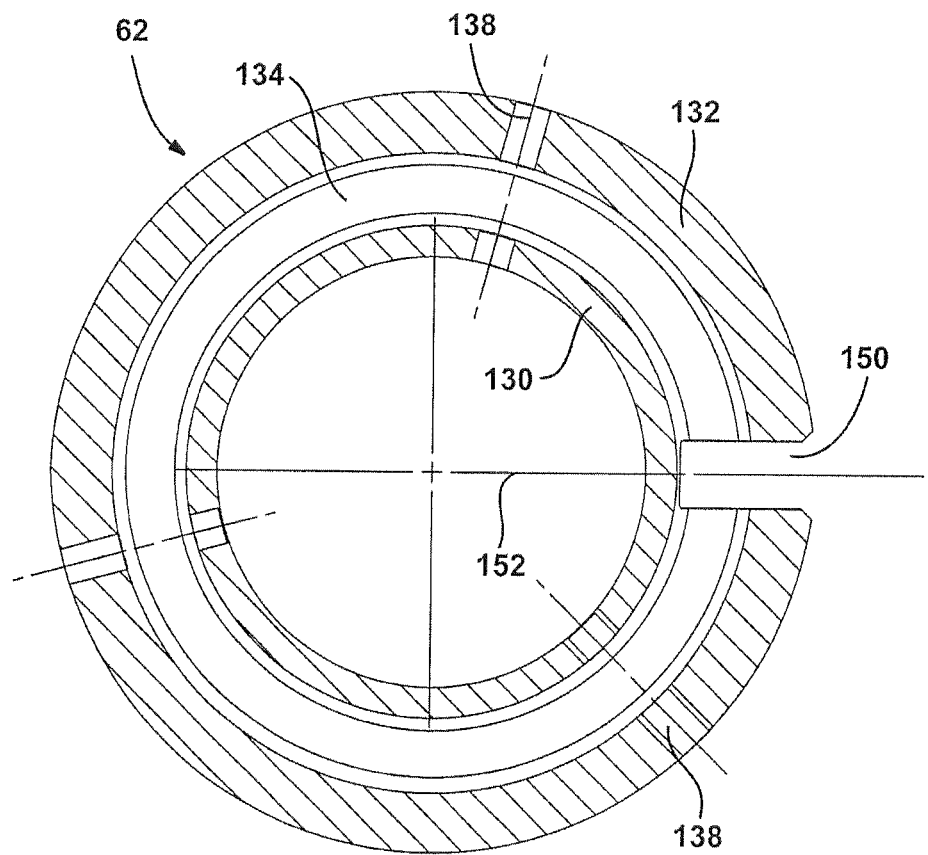
FIG. 10 is a sectional view of the hub taken along the line 10-10 of FIG. 9.
Figure 15:
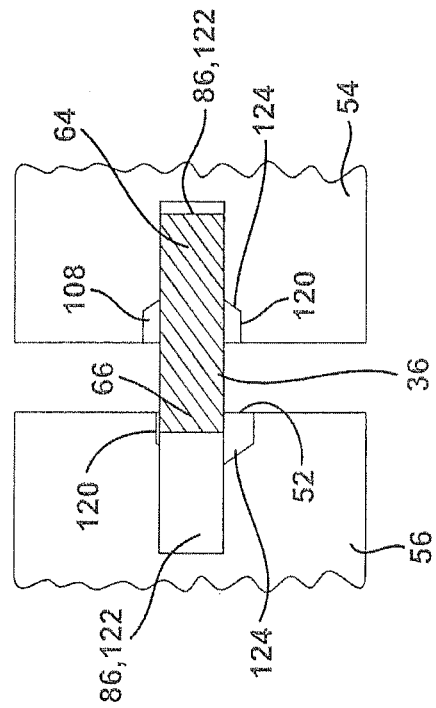
FIG. 15 is a view similar to that of FIG. 12 but illustrating the engagement mechanism in a third position.
Figure 16:
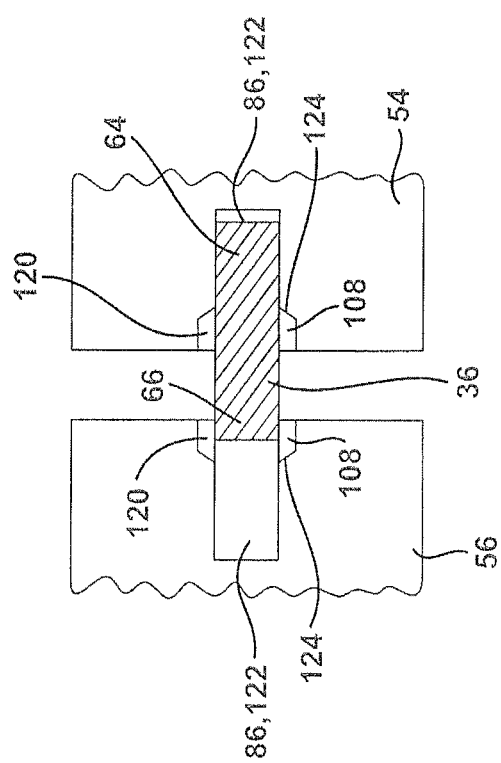
FIG. 16 is similar to FIG. 15, but illustrates relative rotation between the second inner race and the second outer race.

With specific reference to FIGS. 3 and 15, the engagement mechanism 36 is illustrated in the third mode wherein the detent hub 70 is translated toward the first selective gear 42. In this position, the first actuator member 64 is disposed in the first actuator notch 86 in the first inner race 50 and the second portion 122 of the second actuator notch 108 in the first outer race 54 and the second actuator member 66 is disposed in the first actuator notch 86 in the second inner race 52 and the first portion 120 of the second actuator notch 108 in the second outer race 56 and. As the width of the second actuator member 66 is smaller that the width of the first portion 120 of the second actuator notch 108, a limited amount of relative rotation is permitted between the second inner race 52 and the second outer race 56. However, the first inner race 50 and the first outer race 54 are rotatably locked (via the first actuator member 64) as described above. Relative rotation between the second inner race 52 and the second outer race 56, which is illustrated in FIG. 16, causes the second set of wedging elements 60 to rotate relative to the cam surfaces 82 (FIG. 7) such that the rollers 90 are moved from a point at or proximate the mid-point of the cam surfaces 82 (FIG. 7) to a point proximate one of the ends of the cam surfaces 82 (FIG. 7). As the cam surfaces 82 (FIG. 7) are thicker at their ends, it will be appreciated that the rollers 90 of the second set of wedging elements 60 move radially outwardly, thereby engaging the second outer race 56 against the surface of the bore 192 to rotationally lock the second selective gear 46 to the second outer race 56. Consequently, rotary power can be transmitted between the input shaft 14 and the second selective gear 46.

It will be appreciated that the transition portion 124 of the second actuator notch 108 can be shaped to aid in the positioning of an associated one of the first and second actuator members 64 and 66 from the first portion 120 to the second portion 122.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power transmitting device, comprising:
a rotary shaft;
a power transmitting member having an inner bore surface surrounding said shaft;
an engagement mechanism operable for selectively coupling said power transmitting member for rotation with said shaft, said engagement mechanism including a drive hub, a bearing set and an actuator, said drive hub being fixed for rotation with said shaft and defining an annular cavity and an actuator slot, said bearing set being disposed between said shaft and said inner bore surface of said power transmitting member and including an inner race, an outer race and a plurality of roller elements disposed between said inner race and said outer race, said inner race having a first portion fixed for rotation with said shaft and a second portion extending into said annular cavity of said drive hub, said first portion of said inner race defining an annular chamber and said second portion of said inner race defining a first actuator notch that is aligned with said actuator slot of said drive hub, said outer race being a radially expandable split ring having a first portion surrounding said first portion of said inner race to enclose said annular chamber and a second portion extending into said annular cavity of said drive hub, said first portion of said outer race defining an outer engagement surface and said second portion of said outer race defining a second actuator notch that is aligned with said first actuator notch and which includes a first notch portion and a second notch portion, said first notch portion having a larger width dimension than that of said second notch portion, said roller elements each disposed in said enclosed annular chamber between said first portion of said inner race and said first portion of said outer race, said actuator being disposed within said actuator slot of said drive hub for sliding movement relative to said first and second actuator notches between a first mode position and a second mode position, said actuator is operable in its first mode position to be located in said first actuator notch of said inner race and in said second notch portion of said second actuator notch in said outer race to inhibit relative rotation between said inner race and said outer race and maintain said outer race in a radially inward position such that said outer engagement surface of said outer race is disengaged from said inner bore surface of said power transmitting element and said power transmitting member is rotationally disengaged from said shaft, said actuator is operable in its second mode position to be located in said first actuator notch of said inner race and in said first notch portion of said second actuator notch of said outer race so as to permit relative rotation of said outer race relative to said inner race and cause said outer race to expand radially outwardly such that said outer engagement surface of said outer race frictionally engages said inner bore surface of said power transmitting member so as to couple said power transmitting member for rotation with said shaft; and
a shift mechanism for moving said actuator between its first mode position and said second mode position.

2. The power transmitting device of claim 1 wherein said annular chamber formed between said first portion of said inner race and said first portion of said outer race includes a plurality of cam surfaces, and wherein movement of said actuator from its first mode position into its second mode position causes said roller elements to ride along said cam surfaces and radially expand said outer race for engaging said outer drive surface of said outer race with said inner bore surface of said power transmitting member.

3. The power transmitting device of claim 1 wherein said drive hub includes an inner sleeve portion fixed for rotation with said shaft, an outer sleeve portion offset radially from said inner sleeve portion, and a transverse web portion interconnecting said outer sleeve portion and said inner sleeve portion, wherein said annular cavity is delineated by an outer surface of said inner sleeve portion, an inner surface of said outer sleeve portion, and a face surface of said web portion, and wherein said actuator slot is formed to extend through said outer sleeve portion and said web portion of said drive hub.

4. The power transmitting device of claim 3 wherein said actuator includes a detent hub disposed for sliding movement within said actuator slot of said drive hub, and an actuator member extending axially from said detent hub and which is disposed in said annular cavity of said drive hub, and wherein said actuator member has a width dimension about equal to a width dimension of said first actuator notch in said second portion of said inner race and a width dimension of said second notch portion of said second actuator notch formed in said second portion of said outer race, whereby said width dimension of said actuator member and said width dimension of said first actuator notch and said second notch portion of said second actuator notch are selected to inhibit relative rotation between said inner race and said outer race when said detent hub is located in said first mode position.

5. The power transmitting device of claim 4 wherein a width dimension of said first notch portion of said second actuator notch formed in said outer race is larger than said width dimension of said first actuator notch such that movement of said actuator member into said first notch portion upon movement of said detent hub into said second mode position permits limited rotation of said outer race relative to said inner race.

6. A power transmitting device, comprising:
    a rotary shaft;
    a power transmitting member having an inner surface surrounding an outer surface of said rotary shaft;
    an engagement mechanism operable for selectively coupling said power transmitting member for rotation with said shaft, said engagement mechanism including a drive hub, an inner race, an outer race, a plurality of locking elements, and an actuator, said drive hub being fixed for rotation with said shaft and defining an annular cavity and an actuator slot, said inner race being coupled to said outer surface of said shaft and defining a first portion having cam surfaces and a second portion extending from said first portion into said annular cavity of said drive hub and having a first actuator notch formed therein, said outer race having a first portion disposed between said first portion of said inner race and said inner surface of said power transmitting member and a second portion extending from said first portion into said annular cavity of said drive hub and having a second actuator notch formed therein, said second actuator notch having a first notch portion and a second notch portion, said locking elements each disposed between said cam surfaces on said first portion of said inner race and a cylindrical inner surface of said first portion of said outer race, said actuator having an actuator hub disposed within said actuator slot of said drive hub for sliding movement between a first mode position and a second mode position relative to said first actuator notch in said inner race and said second actuator slot in said outer race, said actuator hub being operable in said first mode position to locate an actuator member within said first actuator notch of said inner race and within said second notch portion of said second actuator notch in said outer race to inhibit relative rotation between said inner race and said outer race and inhibit an outer surface of said first portion of said outer race from frictionally engaging said inner surface of said power transmitting member whereby said power transmitting member is rotationally uncoupled from said shaft, said actuator hub being operable in said second mode position to locate said actuator member within said first actuator notch of said inner race and within said first notch portion of said second actuator notch in said outer race to permit limited rotation of said outer race relative to said inner race and cause said locking elements to engage said cam surfaces for causing said outer surface of said first portion of said outer race to frictionally engage said inner surface of said power transmitting member so as to rotationally couple said power transmitting member to said shaft; and
    a shift mechanism for moving said actuator hub between its first and second mode positions.

7. The power transmitting device of claim 6 wherein said outer race is a radially expandable split ring such that engagement of said locking elements with said cam surfaces on said first portion of said inner race causes said outer surface of said first portion of said outer race to move radially outwardly and into frictional engagement with said inner surface of said power transmitting member.

8. The power transmitting device of claim 6 wherein said drive hub includes an inner sleeve portion fixed for rotation with said shaft, an outer sleeve portion offset radially from said inner sleeve portion, and a transverse web portion interconnecting said outer sleeve portion and said inner sleeve portion, wherein said annular cavity is delineated by an outer surface of said inner sleeve portion, an inner surface of said outer sleeve portion, and a face surface of said web portion, and wherein said actuator slot is formed to extend through said outer sleeve portion and said web portion of said drive hub.

9. The power transmitting device of claim 8 wherein said actuator includes a detent hub disposed for sliding movement within said actuator slot of said drive hub, and an actuator member extending axially from said detent hub and which is disposed in said annular cavity of said drive hub, and wherein said actuator member has a width dimension about equal to a width dimension of said first actuator notch in said second portion of said inner race and a width dimension of said second notch portion of said second actuator notch formed in said second portion of said outer race, whereby said width dimension of said actuator member and said width dimension of said first actuator notch and said second notch portion of said second actuator notch are selected to inhibit relative rotation between said inner race and said outer race when said detent hub is located in said first mode position.

10. The power transmitting device of claim 9 wherein a width dimension of said first notch portion of said second actuator notch formed in said outer race is larger than said width dimension of said first actuator notch such that movement of said actuator member into said first notch portion upon movement of said detent hub into said second mode position permits limited rotation of said outer race relative to said inner race.

11. A power transmitting device, comprising:
a shaft;
a gear surrounding said shaft;
an engagement mechanism operable for selectively uncoupling and coupling said gear to said shaft, said engagement mechanism including an inner race coupled for rotation with said shaft and having a first actuator notch formed in a first lip member, an outer race disposed about said inner race and having a second actuator notch formed in a second lip member, said second actuator notch being aligned with said first actuator notch and having a first notch portion defined by a first width dimension and a second notch portion defined by a second width dimension that is smaller than said first width dimension, a plurality of rollers disposed between cam surfaces formed on one of said inner and outer races and a non-cammed surface formed on the other one of said inner and outer races, a drive hub fixed for rotation with said shaft adjacent to said gear and defining an annular cavity and an actuator slot, said first and second lip members extending into said annular cavity such that said first and second actuator notches are aligned with said actuator slot, and an actuator disposed within said actuator slot for sliding movement between a first mode position and a second mode position and having an actuator member, wherein said actuator is operable in said first mode position to locate said actuator member within said first actuator notch and said second notch portion of said second actuator notch to inhibit relative rotation between said inner and outer races for preventing an outer engagement surface of said outer race from frictionally engaging an inner engagement surface of said gear so as to rotationally uncouple said gear from said shaft, and wherein said actuator is operable in said second mode position to locate said actuator member within said first actuator notch and said first notch portion of said second actuator notch to permit limited relative rotation between said inner and outer races such that said rollers engage said cam surfaces and radially displace said outer race so as to cause its outer engagement surface to frictionally engage said inner engagement surface of said gear so as to couple said gear for rotation with said shaft; and
a shift mechanism for moving said actuator between its first and second mode positions.

12. The power transmitting device of claim 11 wherein the drive hub includes an inner sleeve portion fixed to said shaft, an outer sleeve portion radially offset relative to said inner sleeve portion, and a transverse web member that interconnects said inner and outer sleeve portions and delineates said annular cavity defined therebetween, wherein said actuator slot extends through said outer sleeve portion and said web member.

13. The power transmitting device of claim 12, wherein a plurality of lubrication apertures are formed through said inner and outer sleeve portions of said drive hub.

14. The power transmitting device of claim 11, wherein said second actuator notch includes a transition portion which tapers between said first and second notch portions.

15. The power transmitting device of claim 11, wherein said inner race includes a channel and a pair of channel walls, wherein said rollers are received in said channel between said channel walls, and wherein said plurality of cam surfaces are formed on a radially outer surface of said channel.

16. The power transmitting device of claim 15, wherein said inner race further includes said first circumferentially extending lip member that is coupled to one of said channel walls and extends outwardly therefrom in a direction opposite said channel, and wherein said first actuator notch is formed in said first circumferentially extending lip member.

17. The power transmitting device of claim 16, wherein said first circumferentially extending lip member is radially offset from said channel.

18. The power transmitting device of claim 12, wherein said actuator member is integrally formed on an actuator hub, said actuator hub being axially movably mounted on said outer sleeve portion of said drive hub, and wherein said actuator member moves axially with said actuator hub within said actuator slot.

19. The power transmitting device of claim 11 further comprising a second gear surrounding said shaft adjacent to an opposite side of said drive hub and a second engagement mechanism operable for selectively coupling and uncoupling said second gear and said shaft.

20. The power transmitting device of claim 19 wherein said second engagement mechanism includes a second inner race coupled for rotation with said shaft and having a first actuator notch formed in a first lip member, a second outer race disposed about said second inner race and having a second actuator notch formed in a second lip member, said second actuator notch in said second outer race having a first notch portion defined by a first width dimension and a second notch portion defined by a second width dimension that is smaller than said first width dimension, a plurality of second rollers disposed between cam surfaces formed on one of said second inner and outer races and a non-cammed surface formed on the other one of said second inner and outer races, said drive hub defining a second annular cavity communicating with said actuator slot, said first lip member of said second inner race and said second lip member of said second outer race extending into said second annular cavity, wherein said actuator is operable in its first mode position to locate a second actuator member within said first actuator notch of said second inner race and said second notch portion of said second actuator notch in said second outer race to inhibit relative rotation between said second inner and outer races for inhibiting an outer engagement surface of said second outer race from frictionally engaging an inner engagement surface of said second gear so as to rotationally uncouple said second gear from said shaft, and wherein said actuator is operable in a third mode position to locate said second actuator member within said first actuator notch of said second inner race and said first portion of said second actuator notch in said second outer race to permit limited relative rotation between said second inner and outer races such that said second rollers engage said cam surfaces and radially displace said second outer race so as to cause its outer engagement surface to frictionally engage said inner engagement surface of said second gear so as to couple said second gear for rotation with said shaft.

* * * * *